No. 708,271. Patented Sept. 2, 1902.
N. STALKER.
VETERINARY APPLIANCE.
(Application filed Nov. 20, 1901.)
(No Model.)

Witnesses
Inventor
Neil Stalker,
by Harry R. Williams
Attorney

UNITED STATES PATENT OFFICE.

NEIL STALKER, OF WEST HARTFORD, CONNECTICUT.

VETERINARY APPLIANCE.

SPECIFICATION forming part of Letters Patent No. 708,271, dated September 2, 1902.

Application filed November 20, 1901. Serial No. 83,024. (No model.)

*To all whom it may concern:*

Be it known that I, NEIL STALKER, a citizen of the United States, residing at West Hartford, in the county of Hartford and State of Connecticut, have invented certain new and useful Improvements in Veterinary Appliances, of which the following is a specification.

This invention relates to a device which is designed to be applied to a highly-trained and finely-bred stallion for the purpose of preventing the impairment of his vitality.

The object of the invention is to provide a cheap, cleanly, and convenient device of this nature which when applied will not injure or irritate the horse and which will automatically operate in a humane manner to divert the attention of the horse and notify the hostlers when he is in such condition as to need attendance.

The embodiment of the invention that is illustrated by the accompanying drawings has a somewhat flexible shield that is adapted to be attached to a horse by a common surcingle and is provided with an open pocket and a bell arranged to sound an alarm when pressure is applied to a disk at the front of the pocket.

Figure 1:
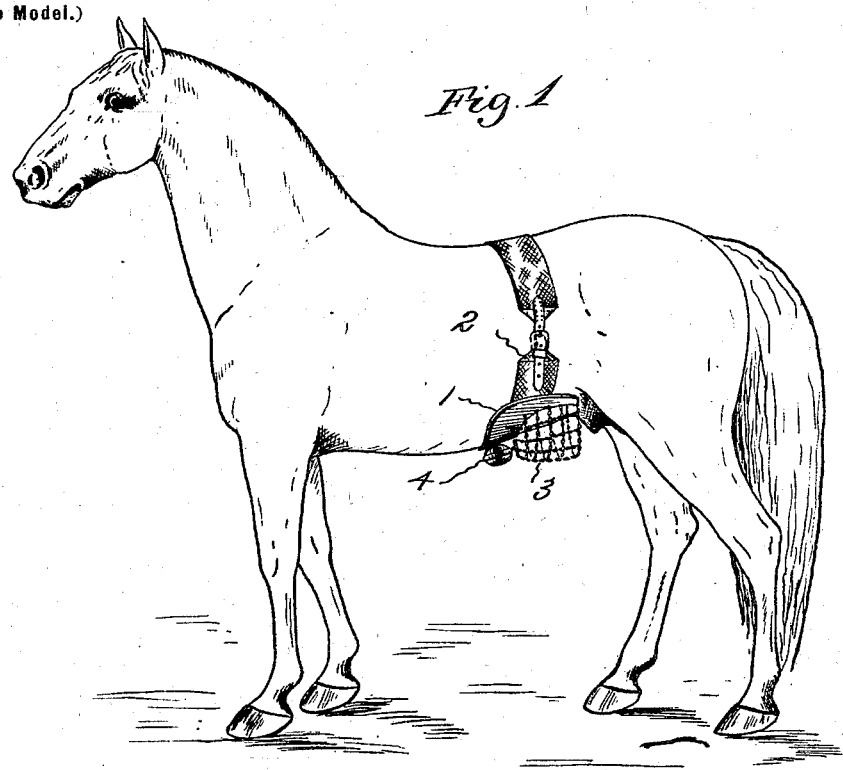
Figure 2:
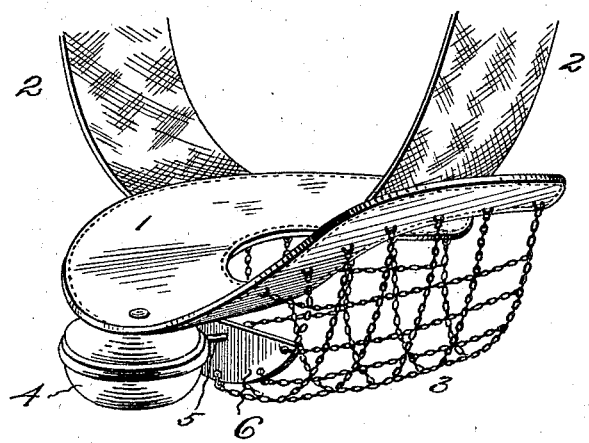

Figure 1 of the drawings shows a device applied to a horse. Fig. 2 is a perspective view of the device.

The U-shaped shield 1 is preferably made of stiff leather, although it could, if desired, be constructed of webbing or other material. The surcingle 2, preferably of webbing with common buckle parts, may be stitched or riveted to the shield. The shield is held by the surcingle beneath the body of the horse with the opening toward the back.

The pocket 3 is fastened to the under side of the shield, so as to hang below the opening. This pocket may be formed of aluminium chains, as shown, or it may be formed of cords or of leather or of canvas, as desired. The chains, however, are preferred, for the reason that they are easily cleaned.

Attached to the under side of the shield just in front of the opening is a common alarm-bell 4 of the class operated by a spring released by a push upon a catch-spindle. The spindle 5 of this bell is connected with a disk 6, that is so located in the front of the pocket that any forward movement of the disk will cause the bell to ring.

Valuable and finely-bred trotting-stallions when highly fed and rigidly trained to put them into condition to exert their utmost energy are nervy, high-strung, and easily excited, and oftentimes their excess of vitality when excited causes them to impair the strength and endurance which has been developed, and thus destroy their value for trotting or breeding purposes. The actions of such a horse during a state of excitement if provided with an appliance embodying this invention causes the disk to be pushed forwardly and the bell to ring, so as to distract his attention and also notify the hostlers that he should have attendance.

I claim as my invention—

A veterinary appliance consisting of a shield, straps for attaching the shield to a horse, a pocket hanging from the shield, an alarm-bell depending from the under side of the shield near the front of the pocket, and a disk located in the front of the pocket and connected with the bell, substantially as specified.

NEIL STALKER.

Witnesses:
H. R. WILLIAMS,
V. R. HOLCOMB.